(12) United States Patent
Zhou

(10) Patent No.: US 8,959,111 B2
(45) Date of Patent: Feb. 17, 2015

(54) PROVIDING ANSWER BOX FUNCTIONALITY TO THIRD PARTY SEARCH ENGINES

(75) Inventor: Xin Zhou, Beijing (CN)

(73) Assignee: Google Inc., Mountain View, CA (US)

( * ) Notice: Subject to any disclaimer, the term of this patent is extended or adjusted under 35 U.S.C. 154(b) by 442 days.

(21) Appl. No.: 13/366,480

(22) Filed: Feb. 6, 2012

(65) Prior Publication Data

US 2012/0143839 A1    Jun. 7, 2012

Related U.S. Application Data

(63) Continuation of application No. PCT/CN2010/073813, filed on Jun. 11, 2010.

(51) Int. Cl.
*G06F 17/30*        (2006.01)

(52) U.S. Cl.
CPC ............................... *G06F 17/30864* (2013.01)
USPC ............ 707/770; 707/707; 707/708; 707/765

(58) Field of Classification Search
CPC .................................................. G06F 17/30864
USPC ..................................... 707/707–708, 765, 770
See application file for complete search history.

(56) References Cited

U.S. PATENT DOCUMENTS

| | | | | |
|---|---|---|---|---|
| 2007/0208755 A1* | 9/2007 | Bhatkar et al. | ................... | 707/10 |
| 2009/0063448 A1* | 3/2009 | DePue et al. | ....................... | 707/5 |
| 2009/0089275 A1 | 4/2009 | Drory et al. | | |
| 2009/0327235 A1* | 12/2009 | Coladonato et al. | .............. | 707/3 |
| 2010/0174736 A1* | 7/2010 | Goodall et al. | ................ | 707/769 |
| 2011/0055185 A1* | 3/2011 | Bitan et al. | ..................... | 707/706 |

FOREIGN PATENT DOCUMENTS

| | | |
|---|---|---|
| CN | 1917540 A | 2/2007 |
| CN | 101667179 A | 3/2010 |
| WO | 2009032543 A2 | 3/2009 |

OTHER PUBLICATIONS

International Search Report and Written Opinion for PCT/CN2010/073813 dated Mar. 17, 2011, 13 pages.

* cited by examiner

*Primary Examiner* — Shew-Fen Lin
(74) *Attorney, Agent, or Firm* — Fish & Richardson P.C.

(57) ABSTRACT

Methods, systems, and apparatus, including computer programs encoded on computer storage media, for providing answer box functionality to a third party search engine. In one aspect, a method includes receiving, by a search engine, a search query, generating one or more search results that are responsive to the search query, generating an answer box request based on the search query, transmitting the answer box request to another search engine, receiving, in response to the answer box request, an answer box result from the other search engine, generating a search engine results page that includes one or more of the search results, and that includes an answer box that references information included in the answer box result, and providing the search engine results page.

17 Claims, 4 Drawing Sheets

PROVIDING ANSWER BOX FUNCTIONALITY TO THIRD PARTY SEARCH ENGINES

This application is a continuation of International Application Serial No. PCT/CN2010/073813, filed on Jun. 11, 2010, which is incorporated herein by reference.

BACKGROUND

This specification relates to search engines and, in one particular example, to enriching a search engine results page with results that are generated by a search engine, and with answers that are generated by a different search engine.

An answer box is a web search feature that provides users with answers to questions that are associated with search queries. For example, a search engine may receive a search query that includes specific query keywords that relate to everyday essential information (e.g., "weather," or "time"), reference tools (e.g., "how many," "convert," "n+n," "how big is"), trip planning information (e.g., "show time," "how far is," "map," "where"), or other information. Instead of providing links or snippets of text that reference other web pages, the search engine may return a results page with an answer box that directly answers a question that is stated by, or that is implicit to, a search query.

SUMMARY

Initially, as used by this specification, the term "answer box" refers to a graphical element of a web page that provides an answer to a question that is stated by, or that is implicit to, a search query. The term "answer box result" refers to the formatted information that appears in an answer box in response to specific query keywords. The web search feature known as "OneBox," by Google Inc. of Mountain View, Calif., is one example of a web service that generates and displays answer boxes.

This specification refers to the specific query keywords that cause a search engine to obtain an answer box result or to generate an answer box, as "trigger terms" or "triggers." A trigger term may be associated with a type or category of answer box, such as "movie," "weather," "convert," "how . . . is," "stock price," or the trigger term may be associated with a parameter, such as a particular person name (e.g., to obtain a social network status update), a particular movie name (e.g., to obtain show times), a particular location (e.g., to obtain weather or time information), or a particular business name (e.g., to obtain stock information). The trigger terms may explicitly state, or may imply, a question for which a user is seeking an answer.

Some trigger terms may require a parameter, for example where the trigger term "time" requires a parameter in order to determine a location for which the time information is to be obtained. Alternatively, trigger terms may not require a parameter to be explicitly provided, for example where a parameter (e.g., a default location) may be inferred for a trigger term.

In generating an answer box for a search query, a search engine may obtain information to include in an answer box result from one or more data sources. The answer box result may include formatted information that instantly answers a question that is implicit to, or that is explicitly stated by, a search query. The answer box result may include current or real-time information such as current weather, stock price, show time, location or other information. In other implementations, the answer box result does not include real-time information, for example when trigger term is an address and the answer box result includes map information for the address. The answer box result may include textual information (e.g., a temperature), graphical information (e.g., a weather icon), or other types of information (e.g., a sound file).

In general, one innovative aspect of the subject matter described in this specification may be embodied in methods that include the actions of generating, by a search engine that does not include answer box functionality, a search engine results page that includes an answer box, using information that is generated by another search engine that does include answer box functionality.

In general, another innovative aspect of the subject matter described in this specification may be embodied in methods that include the actions of receiving, by a search engine, a search query, generating one or more search results that are responsive to the search query, generating an answer box request based on the search query, transmitting the answer box request to another search engine, receiving, in response to the answer box request, an answer box result from the other search engine, generating a search engine results page that includes one or more of the search results, and that includes an answer box that references information included in the answer box result, and providing the search engine results page.

In general, another innovative aspect of the subject matter described in this specification may be embodied in methods that include the actions of receiving, by a search engine, a search query, generating one or more search results that are responsive to the search query, generating an answer box request based on the search query, transmitting the answer box request to another search engine, receiving, in response to the answer box request, data that indicates that the other search engine has not identified an answer to a question that is stated by, or that is implicit to, the search query, based on receiving the data, generating a search engine results page that includes one or more of the search results, and that does not include an answer box, and providing the search engine results page.

Other embodiments of each of these aspects include corresponding systems, apparatus, and computer programs recorded on computer storage devices, each configured to perform the actions of the methods.

These and other embodiments may each optionally include one or more of the following features, alone or in combination. For instance, the information included in the answer box result answers a question that is stated by, or that is implicit to, the search query; the answer box request includes the search query; the answer box request specifies a type of answer box result that is to be generated by the other search engine; the actions further include invoking a search engine results page template that includes code that causes the answer box request to be generated and transmitted; the actions further include receiving code from the other search engine, the code, when generated, causing the answer box request to be generated and transmitted, and embedding the code in a search engine results page template; the information included in the answer box result represents current information at a time when or after the answer box request has been transmitted; the search query includes query terms, and generating the answer box request comprises selecting a subset of the query terms; selecting the subset of the query terms further includes selecting one or more types of answer boxes that the other search engine is to generate, and selecting, as the subset, the query terms that correspond to the types of answer boxes; the search engine results page is generated by a desktop search engine; the answer box request is an Asynchronous JavaScript and XML (AJAX) request; and/or the search engine is provided by a first search engine provider, and the other search engine is provided by a different, second search engine provider.

Particular embodiments of the subject matter described in this specification may be implemented so as to realize one or more of the following advantages. The user may request an answer box using a search engine that does not provide answer box functionality, and the search engine results page associated with a search engine that does not provide answer box functionality may include an answer box. Similarly, the user may request an answer box without accessing the web site of another search engine that does include answer box functionality. Because the user does not need to switch search engines in order to obtain an answer box, the user may enjoy a more rewarding and intuitive search experience.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
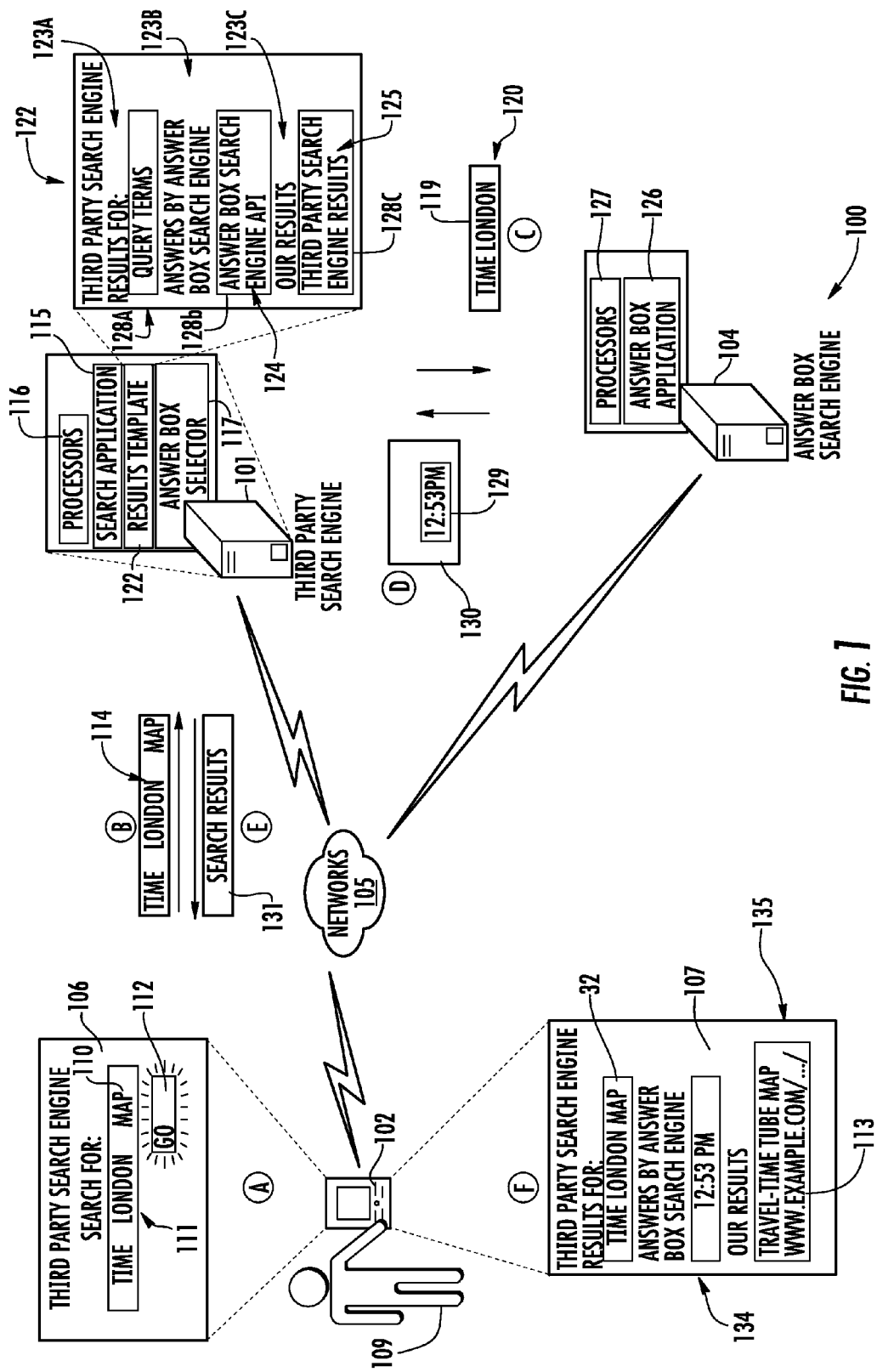
FIG. 1 is a diagram of an example system that provides answer box functionality to a third party search engine.

FIG. 1 is a diagram of an example system 100 that provides answer box functionality to a third party search engine 101. In addition to the search engine 101, the system 100 also includes a mobile client communication device ("client device") 102 (e.g., a cellular telephone, a personal digital assistant (PDA), a personal computer, a music player, a tablet computer, e-book reader, or other processing device), and an answer box (or "other") search engine 104. The search engine 101, the client device 102, and the search engine 104 are in communication with each other over one or more networks 105. The search engine 101 and the other search engine 104 may be managed or otherwise provided by a single search engine provider or company, or by different search engine providers or companies.

This specification refers to the search engine 104 as an "answer box search engine" and as "including answer box functionality," because the search engine 104 may generate answer boxes and/or answer box results, such as by obtaining formatted information from one or more data sources in response to a search query. The search engine 101 is referred to as a "third party search engine" and as "not including answer box functionality," because, other than receiving answer boxes and answer box results from another search engine, it does not itself generate answer boxes or answer box results, and/or because it is operated by a different search engine provider than the search engine 104. The search engine 101, which may be implemented on the client device 102 (e.g., as a desktop search engine), may not be capable of generating answer boxes or answer box results, or may choose not to generate answer boxes or answer box results.

FIG. 1 also shows a flow of data that occurs within the system 100 during states (a) to (f), as well as a search engine home page 106 and a search engine results page 107 that are displayed on the client device 102 during states (a) and (f), respectively. The states (a) to (f) may occur in the illustrated sequence or, in other implementations, they may occur in a sequence that is different than illustrated.

During state (a), the user 109 of the client device 102 enters query terms 110 ("time London map") into a search box 111 on the search engine home page 106, and selects a user interface control 112 to initiate a search query. As used by this specification, a "search query" includes one or more query terms that a user submits to a search engine when the user requests the search engine to perform a search query, where a "term" or a "query term" includes one or more whole or partial words, characters, or strings of characters.

During state (b), the client device 102 communicates a search query 114 that includes the query terms 110, over the networks 105, to the search engine 101. A search application 115 on the search engine 101 generates search results that are responsive to the search query 114 (e.g., using one or more processors 116). As contrasted with an "answer box result," a "result" of the search query 114 (or "search result") includes a Uniform Resource Identifier (URI) that references a resource that the search engine 101 determines to be responsive to the search query 114. The search results may include other things, such as a title, preview image, ratings, map or directions, description of the corresponding resource, or a snippet of text that has been automatically or manually extracted from, or otherwise associated with, the corresponding resource. The search application 115 may, for instance, generate the search result 113 that includes a link to a resource entitled "Travel Time Tube Map," in response to processing the query terms 110 "time London map."

During state (c), an answer box selector 117 of the search engine 101 selects a subset 120 of the query terms 110, and communicates an answer box request 119 that references the query terms of the subset 120 to the answer box search engine 104, over the networks 105. The subset 120 of the query terms 110 may include all of the query terms 110, or fewer than all of the query terms 110. The answer box selector 117 may select the subset 120 of the query terms 110 after selecting the types of answer boxes that it infers are to be obtained from the search engine 104, and by selecting the particular query terms that are trigger terms or parameters which correspond to those types of answer boxes. Communicating the answer box request 119 to the answer box search engine 104 may be tantamount to transmitting all or some of the query terms 110 to a search engine provider that is different than the provider of the search engine 101, or to a different search engine that is provided by the same search engine provider as the search engine 101.

In FIG. 1, for example, the answer box selector 117 may determine (e.g., based on user preferences, or the user's past search history) that map-related answer boxes should not be obtained, but that time-related answer boxes should be obtained. Accordingly, the answer box selector 117 may select the query terms 120 "time" and "London" since they include a trigger term and a parameter, respectively, that correspond to a time-related answer box. The answer box selector 117 may filter the query term "map," since it is not a trigger term or a parameter that corresponds to a time-related answer box or, alternatively, because it is a trigger term that is associated with a map-related answer box. The answer box selector 117 may also add data to the answer box request 119, such as context information, answer-box-type flags, or other trigger terms or parameters, to aid the search engine 104 in generating or prioritizing particular answer boxes and/or answer box results.

The search engine 101 may use a results template 122 to generate search engine results pages that include both search results and answer boxes. For instance, the results template may include formatted text (e.g., title text 123a, answer box header text 123b, and search results header text 123c) and graphical elements (e.g., search box 128a, answer box display region 128b, and search results display region 128c) that are displayed on all search engine results pages generated by the search engine 101.

In addition to visual elements, the results template 122 may include code that, when executed by the search engine 101 while generating a search engine results page, causes the answer box display region 128b to populate with an answer box or an answer box result that the search engine 101 itself does not generate. Specifically, the results template 122 may include an answer box search engine application programming interface (API) code 124 that, when invoked by the search engine 101, triggers the selection of the subset 120 of the query terms 110, and the transmission of the query terms 110 (or the subset 120) to the search engine 104. The results template 122 may include other code, such as search results code 125 that, when invoked by the third party search engine 101, causes the search results display region 128 to populate with search results.

During state (d), an answer box application 126 on the answer box search engine 104 generates an answer box result 130 that is responsive to the selected query terms 120 (e.g., using one or more processors 127). The answer box result 130 may include information was locally stored by the search engine 104 before the answer box request 119 was received, or the answer box result 130 may include information that was generated or dynamically obtained from another data source after the answer box request 119 was received.

Because the query terms of the subset 120 ("time London") imply that the user 109 has a question about the "time" in "London," the search engine 104 obtains an answer to this question, when the answer box request is received. Specifically, the search engine 104 may obtain current time information 129 ("12:53 pm") for the location identified in the subset 120 ("London"), from a time server, in response to receiving the answer box request 119. The search engine 104 includes the current time information 129 in the answer box result 130, and communicates the answer box result 130 over the networks 105 to the search engine 101.

During state (e), the search engine 101 generates code 131 (e.g., Hypertext Markup Language (HTML) code or eXtensible Markup Language (XML) code) for the search engine results page 107. The search engine 101 then communicates the code 131 over the networks 105 to the client device 102.

The search engine results page 107 includes a search box 132, the search result 113 generated by the search engine 102, and an answer box 134 that includes the current time information 129 obtained by the answer box search engine 104. The third party search engine 130 may generate the search engine results page 107 by populating the answer box display region 128b with the current time information 129, and by populating the search results display region 128c with the search result 113. During state (f), the client device 102 invokes the code 131 (e.g., using a web browser), and displays the search engine results page 107.

Figure 2:
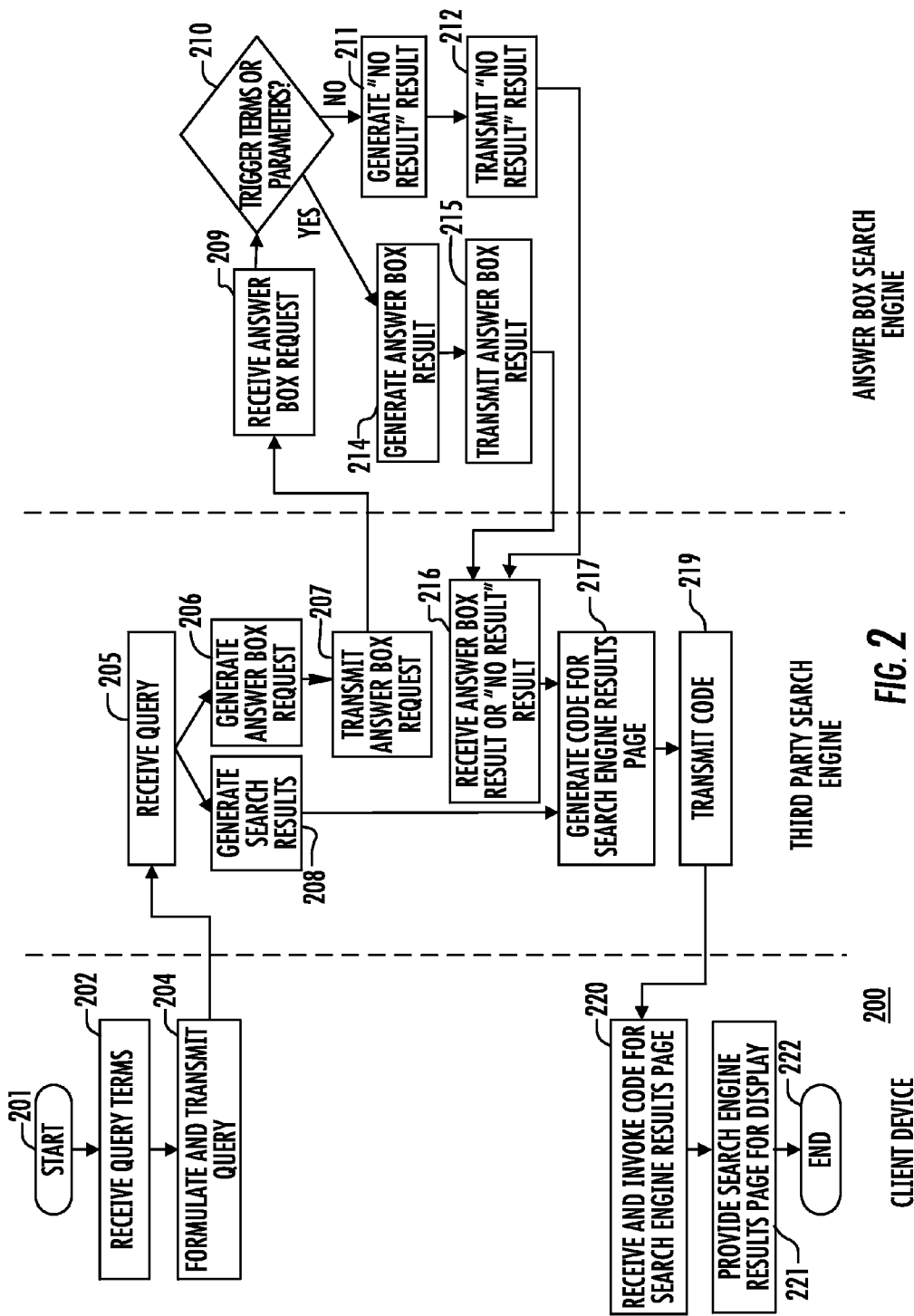
FIG. 2 is a flowchart of an example process that provide answer box functionality to a third party search engine.

FIG. 2 is a flowchart of an example process 200 that provides answer box functionality to a third party search engine. The process 200 begins (301) when a user enters query terms into a client device and initiates a search query (202). The search query is formulated, and is transmitted over a network by the client device (204).

A third party search engine receives the search query from over the network (205), and optionally filters or otherwise processes the query (206), to generate an answer box request. For example, the third party search engine may select a subset of the query terms included in the search query, and may transmit only the query terms of the subset in the answer box request. Alternatively, the third party search engine may append data to the search query before it is transmitted to the answer box search engine as the answer box request, to specify a particular type of answer box for which to generate formatted information. Furthermore, the third party search engine may send the search query itself to the answer box search engine, as the answer box request.

The third party search engine transmits the answer box request over the network to another search engine, such as the answer box search engine (207). The other search engine may be operated or managed by the same search engine provider, or by a different search engine provider. The third party search engine also generates search results (208), before, during, and/or after processing or transmitting the answer box request.

A search engine results page template may include code (e.g., JavaScript or VBScript) or instructions that cause the third party search engine to transmit the answer box request. The code may have been received from the answer box search engine, and may have been embedded in the search engine results page template before receiving the search query. The instructions may also be script functions that are inserted into a web page, such as a home, start, or search page associated with the third party search engine.

In one example, the answer box search engine is identified by the Uniform Resource Locator (URL) "www.example.com," and the code is a portable program module script, such as:

<SCRIPT SRC="HTTP://WWW.EXAMPLE.COM/ANSWERBOX_API.JS"></SCRIPT>.

In another example, the answer box request is an Asynchronous JavaScript and XML (AJAX) request, such as:

HTTP://WWW.EXAMPLE.COM/ANSWERBOX?Q=XXX&TYPE_
WHITELIST=0|1|3|5|6|7

In the above example, "Q=XXX" represents the query term, and "WHITELIST=0|1|3|5|6|7" specifies the types of answer boxes that the answer box search engine is to generate. One example of an answer box type list is:

ANSWERBOX_SERVICES=[ANSWERBOX_WEATHER, ANSWERBOX_STOCK, ANSWERBOX_DICTIONARY, . . . ,]

The answer box search engine receives the answer box request, and parses or analyzes the answer box request to determine if any of the query terms included in the answer box request are trigger terms and/or parameters (209). Determining that the search request includes a trigger term may include automatically parsing the search request into candidate trigger terms, and comparing the candidate trigger terms to a list of known trigger terms, such as a list of known category trigger terms (e.g., "weather," "time," "stock") or a list of known parameters (e.g., business, people or place names).

The candidate trigger terms may be filtered to exclude those trigger terms that require a parameter that is missing, or that require a parameter does not occur in a particular, required sequence. For instance, the candidate trigger term "time" may be excluded as a candidate trigger term if a location parameter is required, and if the parameter following the trigger term "time" on the web page does not reference a location.

If none of the query terms included in the answer box request are trigger terms and/or parameters (210, "No"), the answer box search engine generates a "no result" answer box result (211), and transmits the "no result" response to the third party search engine (212). If the answer box request includes trigger terms and/or parameters (210, "YES"), the answer box search engine generates an answer box result that includes formatted information that answers a question that is stated by, or that is implicit in, the trigger terms and/or parameters (214). Answer box results may be obtained by performing an answer box search on a local search engine using a trigger term and/or parameter, or by initiating a call to an appropriate web service.

The answer box result is transmitted to the third party search engine (215). Answer box results may be transmitted using a particular data type or format, such as an array of strings, or using XML or JavaScript Object Notation (JSON).

The third party search engine receives the answer box result or the "no result" result (216), and generates a search engine results page that includes the search results generated by the third party search engine and, if the answer box generated formatted information and did not generate a "no result" response, an answer box that includes the formatted information (217).

The third party search engine may use a template to generate the search engine results page. The template may include an answer box container to host the answer box results. In one embodiment, an HTML <div> is included in the search engine results page to host the answer box result. One example of a <div> layer that may be used to define the answer box container is:

<DIV ID="ANSWERBOX_DIV"></DIV>

The template may also define parameters that specify when and how to call the answer box search engine, what types of answer boxes should be generated by the answer box search engine, and how the answer box should appear on the search engine results page. For instance, the template may specify which types of answer boxes should be generated, and may attach a function to one or more objects to initialize the selected answer box types. In one example, the template may specify an identifier of an the answer box container, and an identifier of an answer box type.

One example function includes the following code:

```
<SCRIPT>
    // SELECT ANSWER BOX TYPES THAT SHOULD
    BE TRIGGERED
        ANSWERBOX_SERVICES =
        [ANSWERBOX_WEATHER,
ANSWERBOX_STOCK, ANSWERBOX_DICTIONARY, ...., ];
    // ATTACH THE FUNCTION TO THE WINDOW'S ONLOAD
EVENT TO INITIALIZE ANSWER BOX FUNCTIONALITY
    // FIRST PARAMETER IS THE IDENTIFIER OF THE
    ANSWER BOX CONTAINER;
    // SECOND PARAMETER IS THE IDENTIFIER OF THE
    ANSWER BOX TYPE
        WINDOW.ONLOAD =
        ONEBOX_INIT('ONEBOX_DIV',
        'QUERY_BOX_ID');
</SCRIPT>
```

If the answer box search engine only returns a "no result" response, the third party search engine may select a search engine results page template that is not associated with answer boxes. The third party search engine may populate this template with the search results, without incorporating any information received from the answer box search engine.

The third party search engine transmits code (e.g., HTML code) for the search engine results page over the network to the client device (219). The client device receives and invokes the code for the search engine results page from the third party search engine (220), and provides the search engine results page for display (221), thereby ending the process 200 (222).

Figure 3:
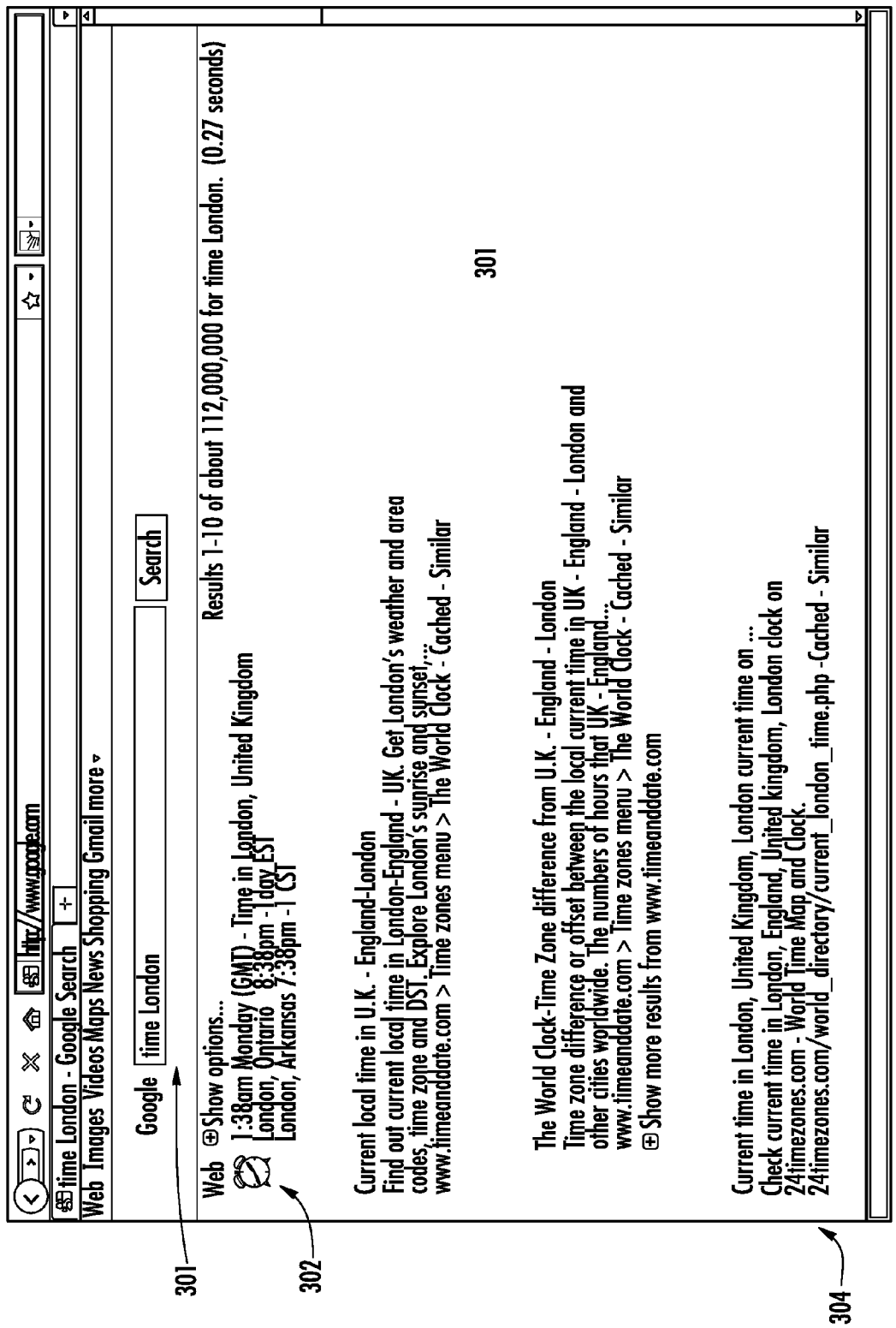
FIG. 3 shows an example search engine results page that is generated by a search engine that does includes answer box functionality.

FIG. 3 shows an example search engine results page 301 that is generated by a search engine that includes answer box functionality. Specifically, in response to the query terms 302 "time London," a search engine that includes answer box functionality (e.g., the Google search engine) generates the search engine results page 301 that includes an answer box 302 and search results 304. Both the answer box 302 and the search results 304 are generated by the search engine.

The answer box 302 is generated by the search engine in response to detecting the trigger term "time" in the query terms 302. In generating an answer box, the search engine has inferred that the query terms implicitly ask the question, "what is the current local time in London?" The time information displayed in the answer box 302 answers this question, for each of three locations named "London."

Figure 4:
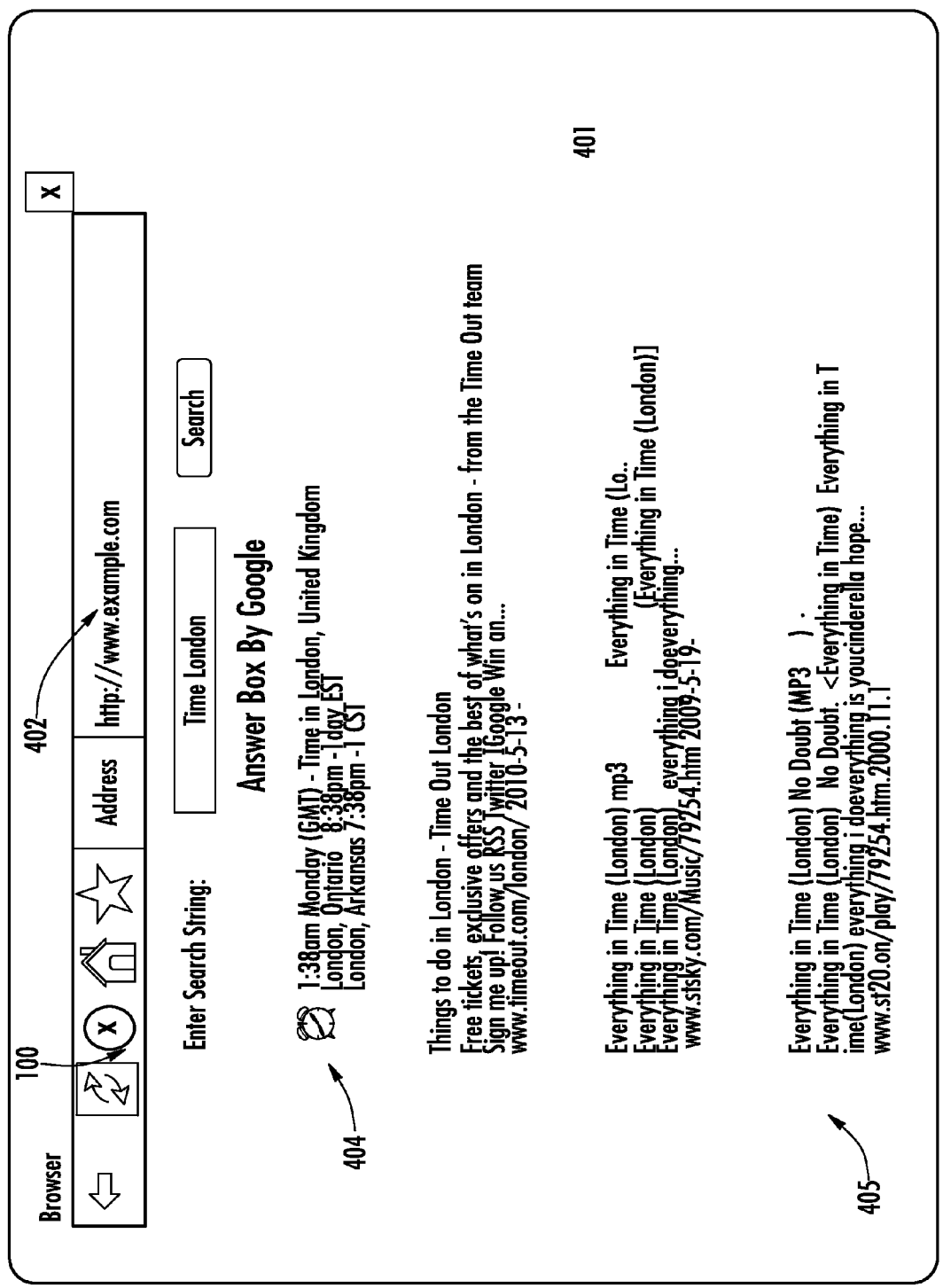
FIG. 4 shows an example search engine results page that is generated by a search engine that does not include answer box functionality.

FIG. 4 shows an example search engine results page 401 that is generated by a search engine that does not itself include answer box functionality, specifically a search engine that is associated with the URL 402 "www.example.com". The search engine results page 401 includes an answer box that includes information that is generated by another search engine (e.g., the Google search engine), as well as search results 405 that are generated by the search engine that does not include answer box functionality.

Unlike FIG. 3, where the user accessed a search engine that includes answer box functionality, the user may obtain an answer box while they are working on a desktop search or using a different search engine, without first determining whether or not the search engine itself includes answer box functionality, and without halting their current search session to change search engines.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A system comprising:
one or more computers; and
a computer-readable medium coupled to the one or more computers having instructions stored thereon which, when executed by the one or more computers, cause the one or more computers to perform operations comprising:
receiving, by a first search engine that is provided by a first search engine provider, answer box code from a second search engine that is provided by a second, different search engine provider, and embedding the second search engine's answer box code in the first search engine's search results template;

receiving, by the first search engine, a search query, generating, by the first search engine, one or more search results that are responsive to the search query, invoking the first search engine's search results template in which the second search engine's answer box code is embedded and, in response to invoking the first search engine's search results template, selecting fewer than all terms of the search query and transmitting the selected terms in an answer box request to the second search engine, receiving, by the first search engine and in response to the answer box request, an answer box result from the second search engine, generating a first search engine results page that includes one or more of the first search engine search results, and that includes an answer box that references information included in the answer box result from the second search engine, and providing the first search engine results page.

2. The system of claim 1, wherein the information included in the answer box result from the second search engine answers a question that is stated by, or that is implicit to, the search query received by the first search engine.

3. The system of claim 1, wherein the answer box request specifies a type of answer box result that is to be generated by the second search engine.

4. The system of claim 1, wherein the information included in the answer box result represents current information at a time when or after the answer box request has been transmitted to the second search engine.

5. The system of claim 1, wherein selecting the fewer than all terms of the search query further comprises:

selecting one or more types of answer boxes that the other search engine is to generate; and selecting the one or more terms that correspond to the types of answer boxes.

6. The system of claim 1, wherein the first search engine results page is generated by a desktop search engine.

7. The system of claim 1, wherein the answer box request comprises an Asynchronous JavaScript and XML (AJAX) request.

8. A computer-implemented method comprising:

receiving, by a first search engine that is provided by a first search engine provider, answer box code from a second search engine that is provided by a second, different search engine provider, and embedding the second search engine's answer box code in the first search engine's search results template;

receiving, by the first search engine, a search query, generating, by the first search engine, one or more search results that are responsive to the search query, invoking the first search engine's search results template in which the second search engine's answer box code is embedded and, in response to invoking the first search engine's search results template, selecting fewer than all terms of the search query and transmitting the selected terms in an answer box request to the second search engine, receiving, by the first search engine and in response to the answer box request, an answer box result from the second search engine, generating a first search engine results page that includes one or more of the first search engine search results, and that includes an answer box that references information included in the answer box result from the second search engine, and providing the first search engine results page.

9. The method of claim 8, wherein the information included in the answer box result from the second search engine answers a question that is stated by, or that is implicit to, the search query received by the first search engine.

10. The method of claim 8, wherein the answer box request specifies a type of answer box result that is to be generated by the second search engine.

11. The method of claim 8, wherein the information included in the answer box result represents current information at a time when or after the answer box request has been transmitted to the second search engine.

12. The method of claim 8, wherein selecting the fewer than all terms of the search query further comprises:

selecting one or more types of answer boxes that the other search engine is to generate; and selecting the one or more terms that correspond to the types of answer boxes.

13. The method of claim 8, wherein the first search engine results page is generated by a desktop search engine.

14. The method of claim 8, wherein the answer box request comprises an Asynchronous JavaScript and XML (AJAX) request.

15. A non-transitory computer-readable medium storing software comprising instructions executable by one or more computers which, upon such execution, cause the one or more computers to perform operations comprising:

receiving, by a first search engine that is provided by a first search engine provider, answer box code from a second search engine that is provided by a second, different search engine provider, and embedding the second search engine's answer box code in the first search engine's search results template;

receiving, by the first search engine, a search query, generating, by the first search engine, one or more search results that are responsive to the search query, invoking the first search engine's search results template in which the second search engine's answer box code is embedded and, in response to invoking the first search engine's search results template, selecting fewer than all terms of the search query and transmitting the selected terms in an answer box request to the second search engine, receiving, by the first search engine and in response to the answer box request, an answer box result from the second search engine, generating a first search engine results page that includes one or more of the first search engine search results, and that includes an answer box that references information included in the answer box result from the second search engine, and providing the first search engine results page.

16. The medium of claim 15, wherein the information included in the answer box result from the second search engine answers a question that is stated by, or that is implicit to, the search query received by the first search engine.

17. The medium of claim 15, wherein the answer box request specifies a type of answer box result that is to be generated by the second search engine.

* * * * *